United States Patent
Awada et al.

(10) Patent No.: US 12,556,983 B2
(45) Date of Patent: Feb. 17, 2026

(54) UE FALLBACK FROM DUAL-ACTIVE PROTOCOL STACK TO CONDITIONAL HANDOVER

(71) Applicant: Nokia Technologies Oy, Espoo (FI)

(72) Inventors: Ahmad Awada, Munich (DE); Jedrzej Stanczak, Wroclaw (PL); Ömer Bulakci, Munich (DE); Srinivasan Selvaganapathy, Bangalore (IN); Tero Henttonen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 427 days.

(21) Appl. No.: 18/005,194

(22) PCT Filed: Jul. 12, 2021

(86) PCT No.: PCT/EP2021/069301
§ 371 (c)(1),
(2) Date: Jan. 12, 2023

(87) PCT Pub. No.: WO2022/037847
PCT Pub. Date: Feb. 24, 2022

(65) Prior Publication Data
US 2023/0232300 A1    Jul. 20, 2023

(30) Foreign Application Priority Data
Aug. 19, 2020 (IN) .............................. 202041035752

(51) Int. Cl.
*H04W 36/00* (2009.01)
*H04W 36/24* (2009.01)
(Continued)

(52) U.S. Cl.
CPC ... *H04W 36/0069* (2018.08); *H04W 36/0072* (2013.01); *H04W 36/0085* (2018.08);
(Continued)

(58) Field of Classification Search
CPC ....... H04W 36/0069; H04W 36/00695; H04W 36/00698; H04W 36/0072;
(Continued)

(56) References Cited

U.S. PATENT DOCUMENTS

2019/0253945 A1* 8/2019 Paladugu .......... H04W 12/0433
2022/0394578 A1* 12/2022 Wu ..................... H04W 36/362
(Continued)

OTHER PUBLICATIONS

"3rd Generation Partnership Project; Technical Specification Group Radio Access Network; NR; NR and NG-RAN Overall Description; Stage 2 (Release 16)", 3GPP TS 38.300, V16.1.0, Mar. 2020, pp. 1-133.
(Continued)

Primary Examiner — Matthew W Genack
(74) Attorney, Agent, or Firm — Barta Jones, PLLC

(57) ABSTRACT

A method and apparatus may include receiving, by a user equipment from a source cell, a first configuration configured for conditional handover and dual active protocol stack handover with a reduced target cell configuration, and a second configuration configured for conditional handover only. The method may further include determining, by the user equipment, the availability of at least one radio link associated with the source cell. The method may further include performing, by the user equipment, a conditional handover procedure according to at least one of the received configurations based upon the determination.

12 Claims, 11 Drawing Sheets

(51) Int. Cl.
*H04W 36/36* (2009.01)
*H04W 36/08* (2009.01)

(52) U.S. Cl.
CPC ......... *H04W 36/24* (2013.01); *H04W 36/362* (2023.05); *H04W 36/08* (2013.01)

(58) Field of Classification Search
CPC ......... H04W 36/0085; H04W 36/0088; H04W 36/0094; H04W 36/24; H04W 26/34; H04W 36/36; H04W 36/362
See application file for complete search history.

(56) References Cited

U.S. PATENT DOCUMENTS

| | | | | |
|---|---|---|---|---|
| 2023/0292195 A1* | 9/2023 | Bergqvist | .......... | H04W 36/0079 |
| 2023/0292205 A1* | 9/2023 | Ramachandra | ....... | H04W 24/02 |

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16)", 3GPP TS 36.300, V16.1.0, Mar. 2020, pp. 1-386.

"3rd Generation Partnership Project; Technical Specification Group Radio Access Network; NR; Radio Resource Control (RRC) protocol specification (Release 16)", 3GPP TS 38.331, V16.0.0, Mar. 2020, pp. 1-835.

"3rd Generation Partnership Project; Technical Specification Group Radio Access Network; Evolved Universal Terrestrial Radio Access (E-UTRA); Radio Resource Control (RRC); Protocol specification (Release 16)", 3GPP TS 36.331, V16.0.0, Mar. 2020, pp. 1-1048.

"3rd Generation Partnership Project; Technical Specification Group Radio Access Network; NG-RAN; Xn application protocol (XnAP) (Release 16)", 3GPP TS 38.423, V16.1.0, Mar. 2020, pp. 1-334.

"3rd Generation Partnership Project; Technical Specification Group Radio Access Network; Evolved Universal Terrestrial Radio Access Network (E-UTRAN); X2 application protocol (X2AP) (Release 16)", 3GPP TS 36.423, V16.1.0, Mar. 2020, pp. 1-438.

"Msc-generator", Sourceforge, Retrieved on Jan. 5, 2022, Webpage available at : https://sourceforge.net/projects/msc-generator/.

Invitation To Pay Additional Fees received for corresponding Patent Cooperation Treaty Application No. PCT/EP2021/069301, dated Nov. 3, 2021, 14 pages.

"Coexistence of Simultaneous Connectivity and CHO", 3GPP TSG-RAN WG2 Meeting #108, R2-1914488, Agenda Item: 6.9.3.3. CATT, Nov. 18-22, 2019, 3 pages.

"Combination of CHO and DAPS", 3GPP TSG-RAN WG2 #108, R2-1915455, Agenda item: 6.9.3.3 Conditional handover—other aspect, NEC, Nov. 18-22, 2019, 4 pages.

"Conditional reconfigurations and DAPS handover", 3GPP TSG-RAN WG2 #114-e, R2-2105888, Agenda Item: 6.4.1, Ericsson, May 19-27, 2021, pp. 1-13.

"Reconfiguration during DAPS HO", 3GPP TSG-RAN WG2 #113bis-e, R2-2102820, Agenda Item: 6.4.2, Ericsson, Apr. 12-20, 2021, pp. 1-24.

"Combination of CHO and RUDI Handover", 3GPP TSG-RAN WG2 Meeting #108, R2-1915037, Agenda Item: 6.9.3.3, ETRI, Nov. 18-22, 2019, 5 pages.

"LBT failure detection and recovery for DAPS and CHO", 3GPP TSG-RAN WG2 #110-e, R2-2005329, Agenda Item: 6.2.2, Ericsson, Jun. 1-12, 2020, pp. 1-5.

"Combination of CHO and DAPS HO", 3GPP TSG-RAN WG2 Meeting #109 electronic, R2-2000923, Agenda item: 6.9.3.1, CMCC, Feb. 24-Mar. 6, 2020, 5 pages.

International Search Report and Written Opinion received for corresponding Patent Cooperation Treaty Application No. PCT/EP2021/069301, dated Jan. 3, 2022, 21 pages.

* cited by examiner

UE FALLBACK FROM DUAL-ACTIVE PROTOCOL STACK TO CONDITIONAL HANDOVER

RELATED APPLICATION

This application was originally filed as PCT Application No. PCT/EP2021/069301, filed on 12 Jul. 2021, which claims priority from Indian Provisional Application No. 202041035752, filed on 19 Aug. 2020, each of which is incorporated herein by reference in its entirety.

TECHNICAL FIELD

Some example embodiments may generally relate to mobile or wireless telecommunication systems, such as Long Term Evolution (LTE), fifth generation (5G) radio access technology (RAT), new radio (NR) access technology, and/or other communications systems. For example, certain example embodiments may relate to systems and/or methods for fallback from dual-active protocol stack to conditional handover.

BACKGROUND

Examples of mobile or wireless telecommunication systems may include 5G RAT, the Universal Mobile Telecommunications System (UMTS) Terrestrial Radio Access Network (UTRAN), LTE Evolved UTRAN (E-UTRAN), LTE-Advanced (LTE-A), LTE-A Pro, NR access technology, and/or MulteFire Alliance. 5G wireless systems refer to the next generation (NG) of radio systems and network architecture. A 5G system is typically built on a 5G NR, but a 5G (or NG) network may also be built on E-UTRA radio. It is expected that NR can support service categories such as enhanced mobile broadband (eMBB), ultra-reliable low-latency-communication (URLLC), and massive machine type communication (mMTC). NR is expected to deliver extreme broadband, ultra-robust, low latency connectivity, and massive networking to support the Internet of Things (IoT). The next generation radio access network (NG-RAN) represents the RAN for 5G, which may provide radio access for NR, LTE, and LTE-A. It is noted that the nodes in 5G providing radio access functionality to a user equipment (e.g., similar to the Node B in UTRAN or the Evolved Node B (eNB) in LTE) may be referred to as next-generation Node B (gNB) when built on NR radio, and may be referred to as next-generation eNB (NG-eNB) when built on E-UTRA radio.

SUMMARY

In accordance with some embodiments, a method may include receiving, by a user equipment from a source cell, a first configuration configured for conditional handover and dual active protocol stack handover with a reduced target cell configuration, and a second configuration configured for conditional handover only. The method may further include determining, by the user equipment, the availability of at least one radio link associated with the source cell. The method may further include performing, by the user equipment, a conditional handover procedure according to at least one of the received configurations based upon the determination.

In accordance with certain embodiments, an apparatus may include means for receiving a first configuration configured for conditional handover and dual active protocol stack handover with a reduced target cell configuration, and a second configuration configured for conditional handover only. The apparatus may further include means for determining the availability of at least one radio link associated with the source cell. The apparatus may further include means for performing a conditional handover procedure according to at least one of the received configurations based upon the determination.

In accordance with various embodiments, an apparatus may include at least one processor and at least one memory including computer program code. The at least one memory and the computer program code may be configured to, with the at least one processor, cause the apparatus to at least receive a first configuration configured for conditional handover and dual active protocol stack handover with a reduced target cell configuration, and a second configuration configured for conditional handover only. The at least one memory and the computer program code may be further configured to, with the at least one processor, cause the apparatus to at least determine the availability of at least one radio link associated with the source cell. The at least one memory and the computer program code may be further configured to, with the at least one processor, cause the apparatus to at least perform a conditional handover procedure according to at least one of the received configurations based upon the determination.

In accordance with some embodiments, a non-transitory computer readable medium may be encoded with instructions that may, when executed in hardware, perform a method. The method may include receiving a first configuration configured for conditional handover and dual active protocol stack handover with a reduced target cell configuration, and a second configuration configured for conditional handover only. The method may further include determining the availability of at least one radio link associated with the source cell. The method may further include performing a conditional handover procedure according to at least one of the received configurations based upon the determination.

In accordance with certain embodiments, a computer program product may perform a method. The method may include receiving a first configuration configured for conditional handover and dual active protocol stack handover with a reduced target cell configuration, and a second configuration configured for conditional handover only. The method may further include determining the availability of at least one radio link associated with the source cell. The method may further include performing a conditional handover procedure according to at least one of the received configurations based upon the determination.

In accordance with various embodiments, an apparatus may include circuitry configured to receive a first configuration configured for conditional handover and dual active protocol stack handover with a reduced target cell configuration, and a second configuration configured for conditional handover only. The circuitry may further be configured to determine the availability of at least one radio link associated with the source cell. The circuitry may further be configured to perform a conditional handover procedure according to at least one of the received configurations based upon the determination.

In accordance with some embodiments, a method may include receiving, by a user equipment from a source cell, a first configuration configured for a reduced target cell configuration, and a second configuration configured for the addition of secondary cells. The method may further include determining, by the user equipment, the availability of at least one radio link associated with the source cell. The method may further include performing, by the user equipment, at least one conditional handover procedure according to at least one of the received configurations based upon the determination.

In accordance with certain embodiments, an apparatus may include means for receiving a first configuration configured for a reduced target cell configuration, and a second configuration configured for the addition of secondary cells. The apparatus may further include means for determining the availability of at least one radio link associated with the source cell. The apparatus may further include means for performing at least one conditional handover procedure according to at least one of the received configurations based upon the determination.

In accordance with various embodiments, an apparatus may include at least one processor and at least one memory including computer program code. The at least one memory and the computer program code may be configured to, with the at least one processor, cause the apparatus to at least receive a first configuration configured for a reduced target cell configuration, and a second configuration configured for the addition of secondary cells. The at least one memory and the computer program code may be further configured to, with the at least one processor, cause the apparatus to at least determine the availability of at least one radio link associated with the source cell. The at least one memory and the computer program code may be further configured to, with the at least one processor, cause the apparatus to at least perform at least one conditional handover procedure according to at least one of the received configurations based upon the determination.

In accordance with some embodiments, a non-transitory computer readable medium may be encoded with instructions that may, when executed in hardware, perform a method. The method may include receiving a first configuration configured for a reduced target cell configuration, and a second configuration configured for the addition of secondary cells. The method may further include determining the availability of at least one radio link associated with the source cell. The method may further include performing at least one conditional handover procedure according to at least one of the received configurations based upon the determination.

In accordance with certain embodiments, a computer program product may perform a method. The method may include receiving a first configuration configured for a reduced target cell configuration, and a second configuration configured for the addition of secondary cells. The method may further include determining the availability of at least one radio link associated with the source cell. The method may further include performing at least one conditional handover procedure according to at least one of the received configurations based upon the determination.

In accordance with various embodiments, an apparatus may include circuitry configured to receive a first configuration configured for a reduced target cell configuration, and a second configuration configured for the addition of secondary cells. The circuitry may further be configured to determine the availability of at least one radio link associated with the source cell. The circuitry may further be configured to perform at least one conditional handover procedure according to at least one of the received configurations based upon the determination.

BRIEF DESCRIPTION OF THE DRAWINGS

For proper understanding of example embodiments, reference should be made to the accompanying drawings, wherein.

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for fallback from dual-active protocol stack to conditional handover is not intended to limit the scope of certain embodiments, but is instead representative of selected example embodiments.

Figure 1:
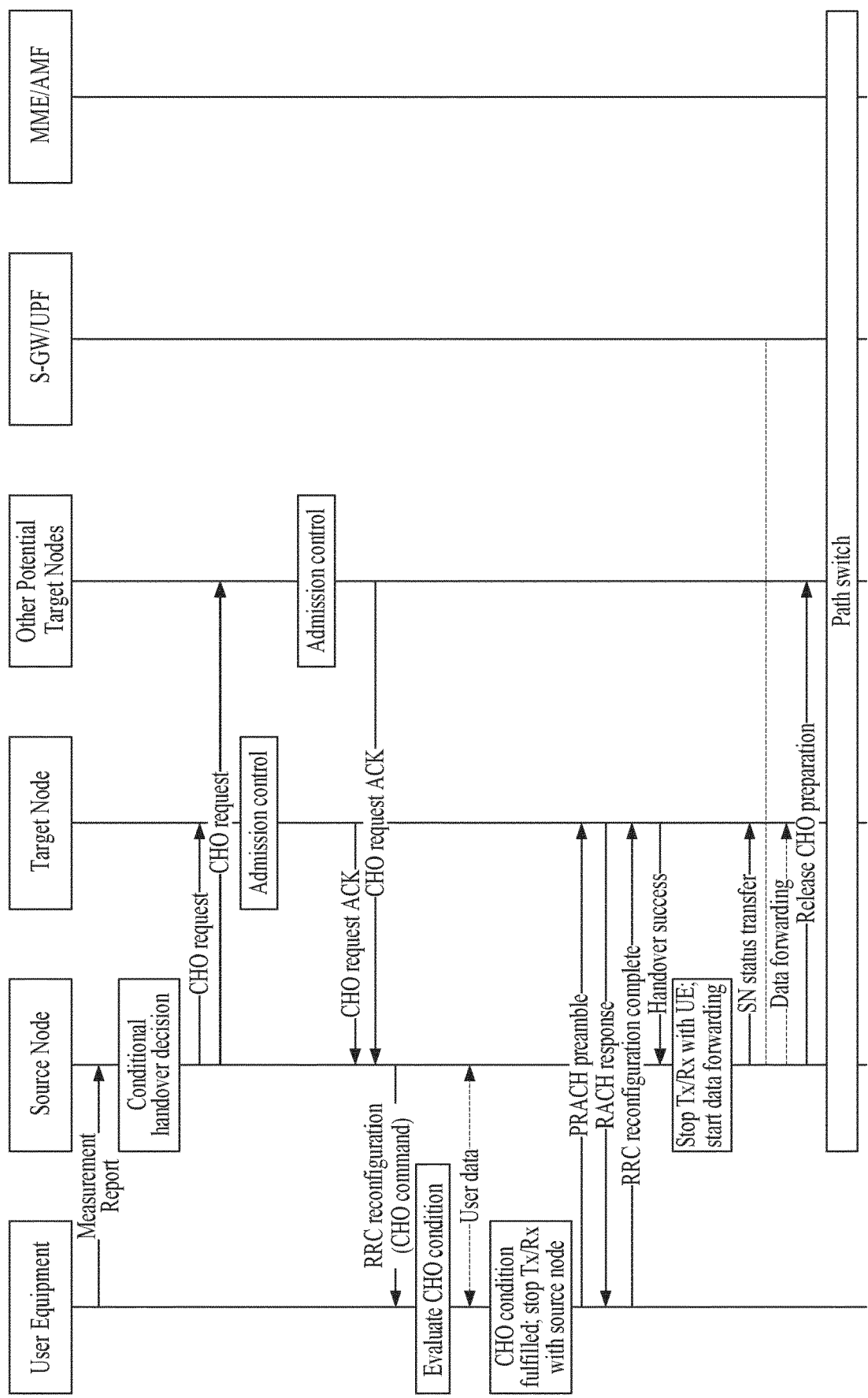
FIG. 1 illustrates a signaling diagram of an example of a conditional handover procedure.

FIG. 1 illustrates an example of conditional handover (CHO) message sequencing. Generally, a configured event triggers a UE to transmit a measurement report to a source node. Using this report, the source node can prepare one or more target cells for the handover process, using CHO Request and Request Acknowledgement messages, and then transmit an RRC Reconfiguration (CHO command) message back to the UE. The UE may then immediately access the target cell to complete the handover. With conditional handover, the UE only accesses the target cell once an additional CHO execution condition expires, such as the handover preparation and execution phases being decoupled. This CHO execution condition can be configured by the source node in an RRC Reconfiguration message containing CHO Command.

Upon the UE completing the handover execution to the target cell (e.g., the UE has transmitted RRC Reconfiguration Complete), the target cell sends a Handover Success indication to the source cell. Upon receiving this indication from the target cell, the source cell may discontinue receiving and transmitting with the UE, and begin forwarding data to the target cell. In addition, the source cell may release the CHO preparations in other target nodes/cell which are no longer needed upon receiving a HO Success indication. CHO allows the HO command to be transmitted early in the process when the UE has a connection established with the source cell without risking access to the target cell and corresponding stability of that radio link. In this way, conditional handover is able to provide mobility robustness.

Figure 2:
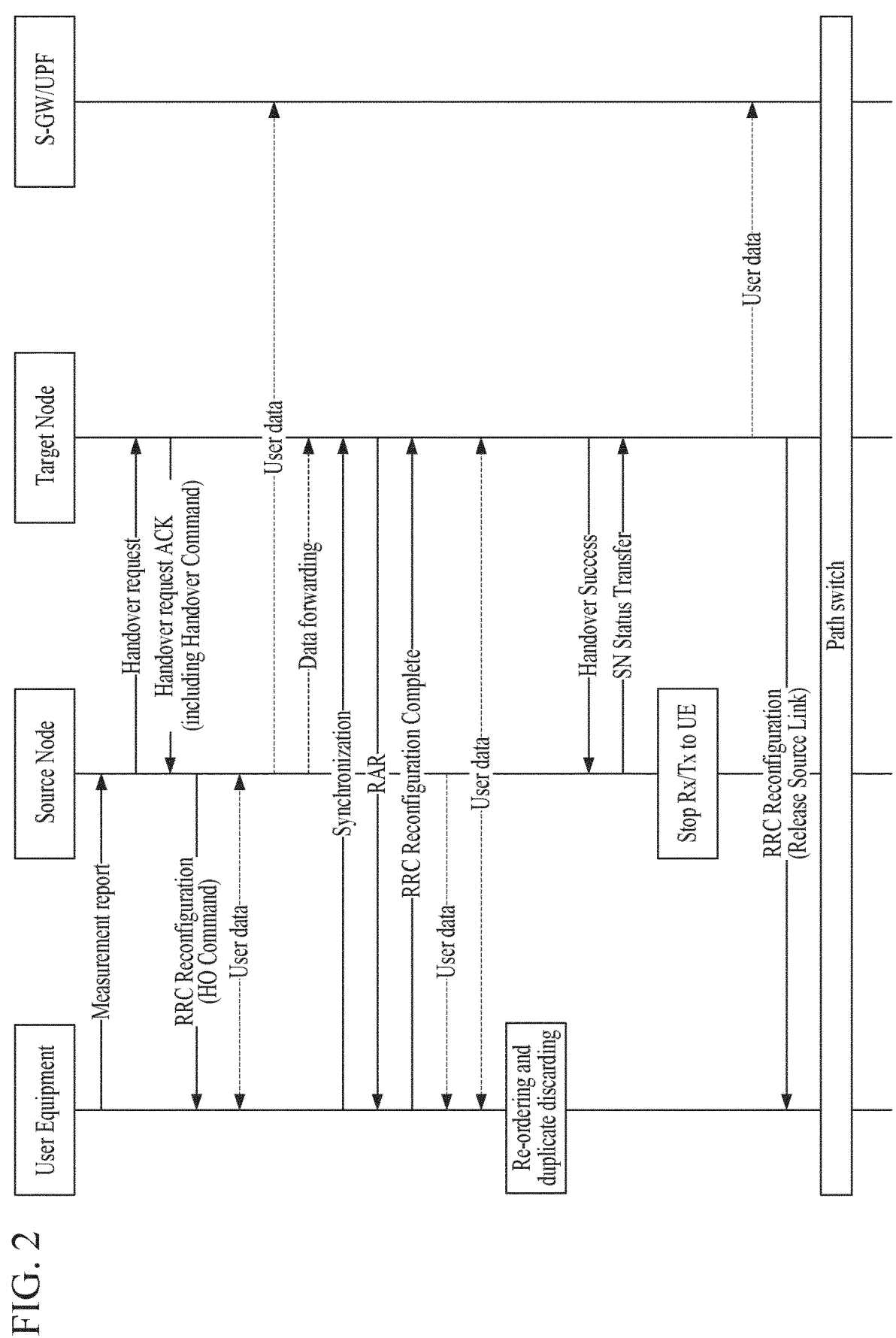
FIG. 2 illustrates a signaling diagram of an example of a dual active protocol stack handover.

The dual active protocol stack (DAPS) handover procedure shown in FIG. 2 can provide nearly 0ms interruption time in downlink and uplink. For example, both the source and target cell use a full L2 protocol stack, with their own security keys, to cipher and decipher packet data convergence protocol (PDCP) service data unit (SDUs). In order to reduce service interruptions caused from hard handovers, the UE can establish a new radio link with respect to the target cell before detaching the radio link of the source cell. Thus, before releasing the source cell, the UE would exchange data with both the source and target nodes.

DAPS handover procedure allows the UE to switch the UL user plane (transmission of new PDCP SDU) to the target cell when random access to the target cell is completed. Any other UL signaling, such as CSI feedback, PDCP status reports, and HARQ feedback, may continue between the UE and the source cell until they are released.

Figure 3:
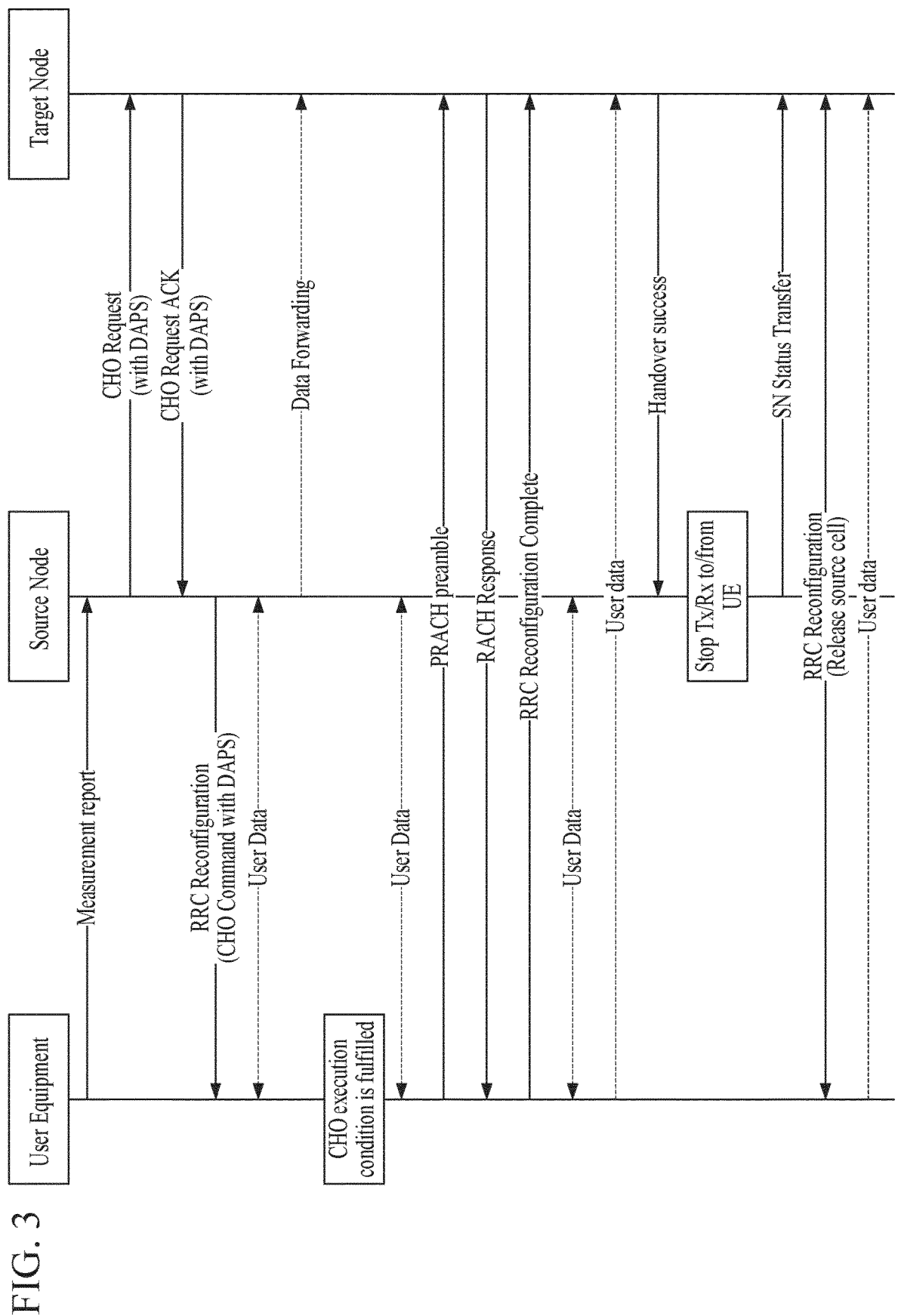
FIG. 3 illustrates a signaling diagram of an example of a combination of conditional handover and dual active protocol stack handover procedures.

It would be preferable to use the advantages of CHO and DAPS procedures to provide both mobility robustness and interruption time reduction during handovers, such as that shown in FIG. 3. After receiving a CHO request for DAPS handover, the target cell provides a CHO command with DAPS configuration. After receiving the CHO command with DAPS from the source cell, the UE can continue to exchange user data with the source cell, and evaluate the CHO execution condition provided by the source cell. Once the CHO execution condition is satisfied, the UE can continue to exchange user data with the source cell while completing the RACH access to the target cell, and standard DAPS handover procedure can then be followed.

As long as the UE is capable of exchanging user plane data with the source cell during the random access to the target cell, the interruption time during the handover can be reduced close to 0ms. However, it is possible that the radio link quality of the source cell may be insufficient or unavailable when the CHO execution is met. For example, beam failure may be detected for the source cell when CHO execution condition is satisfied. Here, the UE would need to perform beam failure recovery to the source cell while performing RACH access to the target cell of the handover. Thus, the UE would likely experience interruptions similar to those of CHO since the UE could not receive any user data from the source cell during beam failure recovery. Another example may involve a timer, such as T310 or T312, running for the source cell when CHO execution condition is met, and/or L1 out-of-sync indication is reported from the physical layer. In this way, the radio link of the source cell may not be reliable, and may cause the UE to experience a severe interruption in DL.

As a result, the UE may continue to execute DAPS handover with unreliable or unavailable source links despite not reducing interruption times close to 0ms. Additionally, the UE may need to perform beam failure recovery with source cell which may only be ready after the target cell has been established. Recovering a source cell which is not used for radio communication during the random access to the target cell may require unnecessary signaling overhead, waste network resources, and increase UE power consumption.

The UE may also need to continue UL transmissions to the source cell, which would also unnecessarily consume UL resources. In both of these cases, the UE would need to configure a separate protocol stack for the source cell, in addition to the target cell, which is then released by the target cell using an RRC Reconfiguration. If the source radio link is not useful, it would be unnecessary for the UE to set up two protocol stacks, rendering as unnecessary the RRC Reconfiguration message sent by the target cell to release the source link. In addition, the DAPS configuration of the target cell would be a reduced configuration with no Secondary Cells (SCells) for carrier aggregation or dual connectivity. Falling back to CHO execution with the possibility of full configuration, including SCells in the target cell, would not require an additional RRC Reconfiguration from the target cell that is needed for DAPS to reconfigure the reduced configuration to full configuration, and allow the UE to utilize the SCell radio links earlier.

Certain embodiments described herein may have various benefits and/or advantages to overcome the disadvantages described above. For example, certain embodiments may provide. Both mobility robustness and interruption time reduction during handover procedure or reduced radio signaling and complexity. Thus, certain embodiments discussed below are directed to improvements in computer-related technology.

Figure 4:
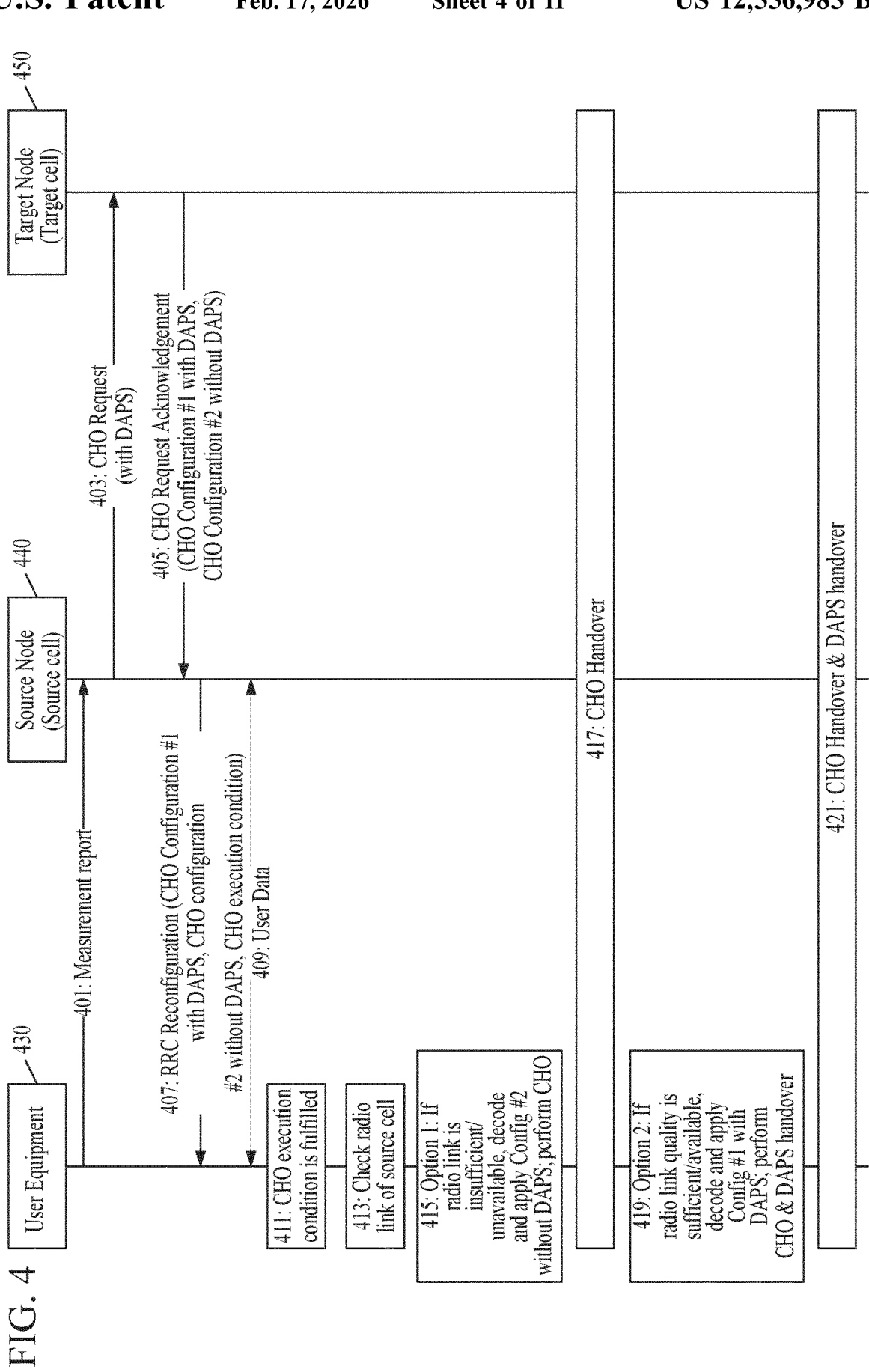
FIG. 4 illustrates a signaling diagram of an example of a handover procedure according to some embodiments.
Figure 10:
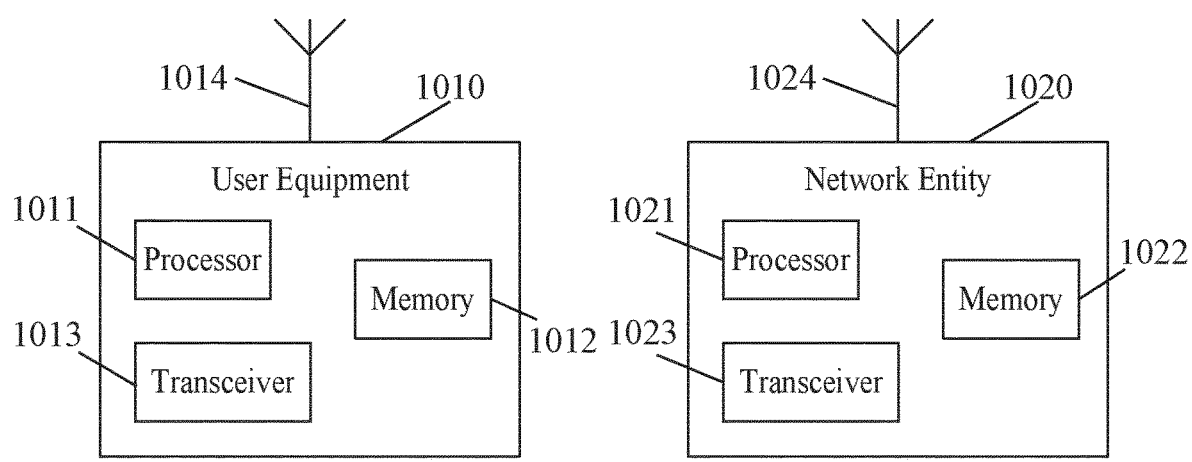
FIG. 10 illustrates an example of various network devices according to various embodiments.

FIG. 4 illustrates an example of a signaling diagram depicting how to fallback from a dual-active protocol stack to a conditional handover. UE 430 may be similar to UE 1010, and Source Node (SN) 440 and Target Node (TN) 450 may be similar to NE 1020, as illustrated in FIG. 10, according to certain embodiments.

At 401, UE 430 may transmit measurement reports to SN 440, which may transmit a CHO request (with DAPS) to TN 450, as shown at 403. Upon receiving the CHO request from SN 440, TN 450 may transmit two target cell configurations to SN 440 at 405. The first configuration may be for CHO and DAPS handover with a reduced target cell configuration, such as PCell only configuration, and the second configuration may be for CHO only, such as a full target configuration (target PCell+SCell configurations). At 407, SN 440 may transmit the two cell configurations associated with the same CHO execution condition to UE 430, and at 409, UE 430 and SN 440 may exchange user data. For intra-frequency handover, A3 event is typically configured for CHO execution condition. That is CHO execution condition is fulfilled when the measurement of the neighboring target cell in TN 450 is offset better than the measurement of the source cell in SN 440 for certain Time-to-Trigger (TTT) duration. Another alternative is to configure event A5 for CHO execution condition which is typically used for inter-frequency handovers. A CHO execution condition configured with event A5 is fulfilled when the measurement of the source cell in SN 440 is below threshold 1 and the measurement of the neighboring target cell in TN 450 is higher than threshold 2 for TTT duration.

At 411, UE 430 may determine that CHO execution condition has been fulfilled for target cell in TN 450, and may check radio link with SN 440 at 413. It is noted that, while one TN is illustrated in FIG. 4 with one CHO execution, any number of TNs may be used with an equal number of CHO execution conditions. For example, the check of radio link with SN 440 may include that beam failure detection has been already detected, and/or radio link is not yet recovered. This may be where timer T310 has not yet expired, and UE 430 is in a beam failure recovery procedure. In addition, the check of radio link with SN 440 may also include active T310 or T312 timers for RLF detection. Additionally or alternatively, signal strength (e.g., RSRP), signal quality (e.g., RSRQ), and/or SINR of the source link may be below a threshold, which may be provided by SN 440 or TN 450 in dedicated signalling 407 of FIG. 4 or in system information. Another check of radio link with SN 440 may include that at least N≥1 out-of-sync indications are reported by the physical layer, where N could be configured by SN 440 and/or TN 450. Finally, 413 may be performed based on the number of RLC re-transmissions, random access re-transmissions or scheduling requests for SN 440 have reached a certain number, Q, configured by SN 440 or TN 450.

At 415, UE 430 may determine that the radio link is insufficient or unavailable, and decode and apply the second configuration for CHO only. With the CHO configuration applied, at 417, UE 430 may perform a CHO handover procedure with SN 440 and TN 450. However, at 419, if UE 430 determines that the radio link is sufficient and available, UE 430 may decode and apply the first configuration with DAPS. Using the first configuration, at 421, UE 430 may perform CHO & DAPS handover with SN 440 and TN 450.

Figure 5:
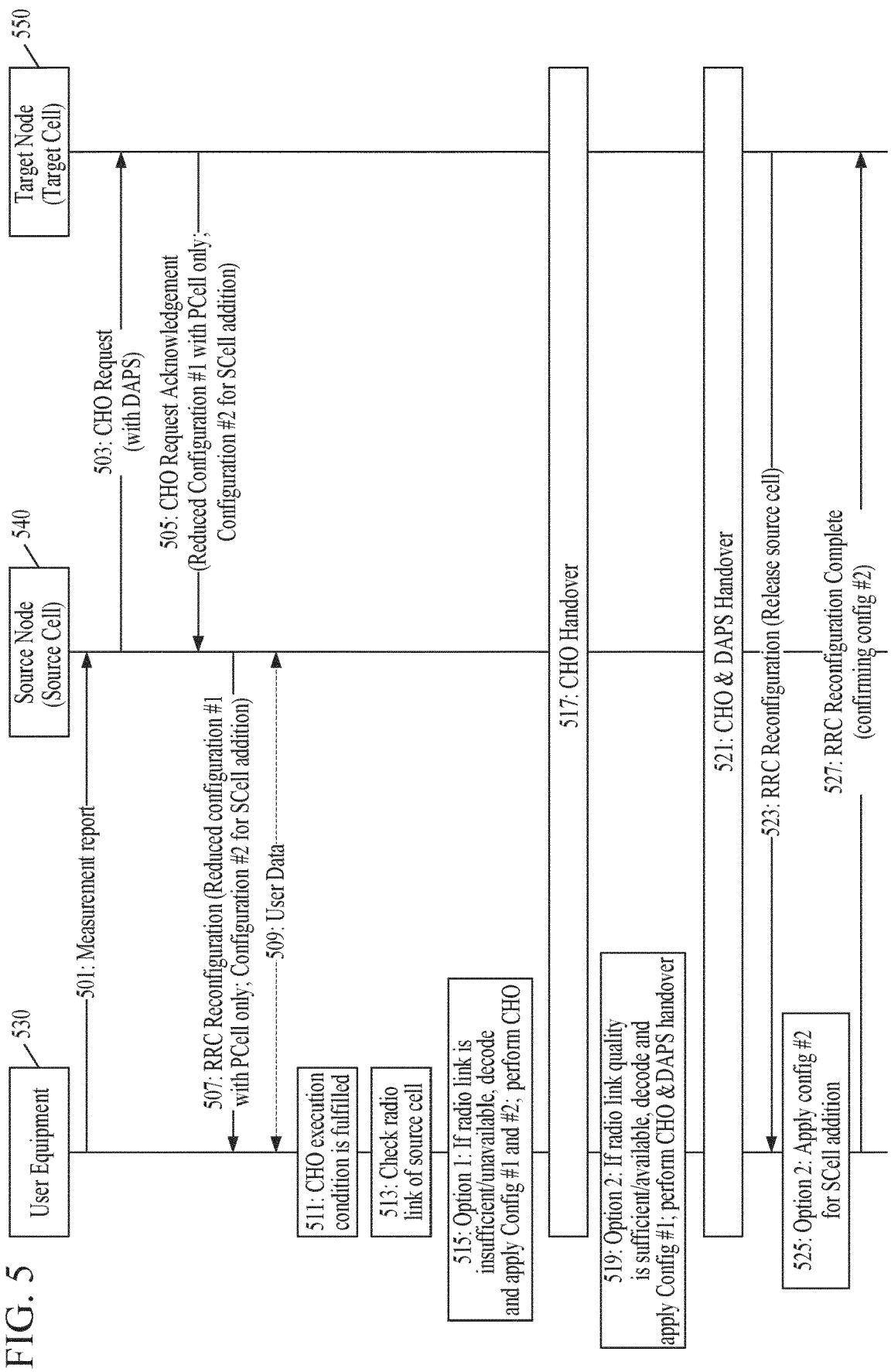
FIG. 5 illustrates a signaling diagram of another example of a handover procedure according to various embodiments.

FIG. 5 illustrates another example of a signaling diagram depicting how to fallback from a dual-active protocol stack to a conditional handover. UE 530 may be similar to UE 1010, and SN 540 and TN 550 may be similar to NE 1020, as illustrated in FIG. 10, according to certain embodiments.

At 501, UE 530 may transmit measurement reports to SN 540, which may transmit a CHO request (with DAPS) to TN 550, as shown at 503. Upon receiving the CHO request from SN 540, TN 550 may transmit two target cell configurations to SN 540 at 505. The first configuration may be for a reduced target cell configuration, such as PCell only configuration, and the second configuration may be for the addition of SCells. At 507, SN 440 may transmit the two cell configurations to UE 540, along with CHO execution conditions, and at 509, UE 530 and SN 540 may exchange user data.

At 511, UE 530 may determine that CHO execution condition have been fulfilled for the target cell in TN 550, and may check radio link with SN 540 at 513. For example, the check of radio link with SN 540 may include that beam failure detection has been already detected, and/or radio links are not yet recovered. This may be where timer T310 has not yet expired, and/or UE 530 is in a beam failure recovery procedure. In addition, the check of radio link with SN 540 may also include an active T310 or T312 timer for RLF. Additionally or alternatively, signal strength (e.g., RSRP), signal quality (e.g., RSRQ), and/or SINR of the source link may be below a threshold, which may be provided by SN 540 or TN 550 using dedicated signalling 507 or in system information. Another check of radio link with SN 540 may include that at least N≥1 out-of-sync indications are reported by the physical layer, where N could be configured by SN 540 and/or TN 550. Finally, 513 may be performed based on the number of RLC re-transmissions, random access re-transmissions or scheduling requests for SN 540 have reached a certain number, Q, configured by SN 540 or TN 550.

At 515, UE 430 may determine that the radio link is insufficient or unavailable, and decode & apply the first and second configurations. With both configurations applied, at 517, UE 530 may perform a CHO handover procedure with SN 540 and TN 550. However, at 519, if UE 530 determines that the radio link is sufficient and available, UE 530 may decode and apply the first configuration with reduced target cell configuration (PCell). Using the first configuration, at 521, UE 530 may perform CHO & DAPS handover with SN 540 and TN 550. At 523, TN 550 may transmit to UE 530 an RRC Reconfiguration message to release the protocol stack of SN 540. At 525, UE 530 may then decode & apply the second configuration for adding SCells at 525, and transmit an RRC Reconfiguration Complete message to TN 550. In this way, UE 530 may fallback to executing CHO rather than CHO/DAPS when the radio link of SN 540 is insufficient or unavailable, avoiding some disadvantages of continuing with DAPS.

Figure 6:
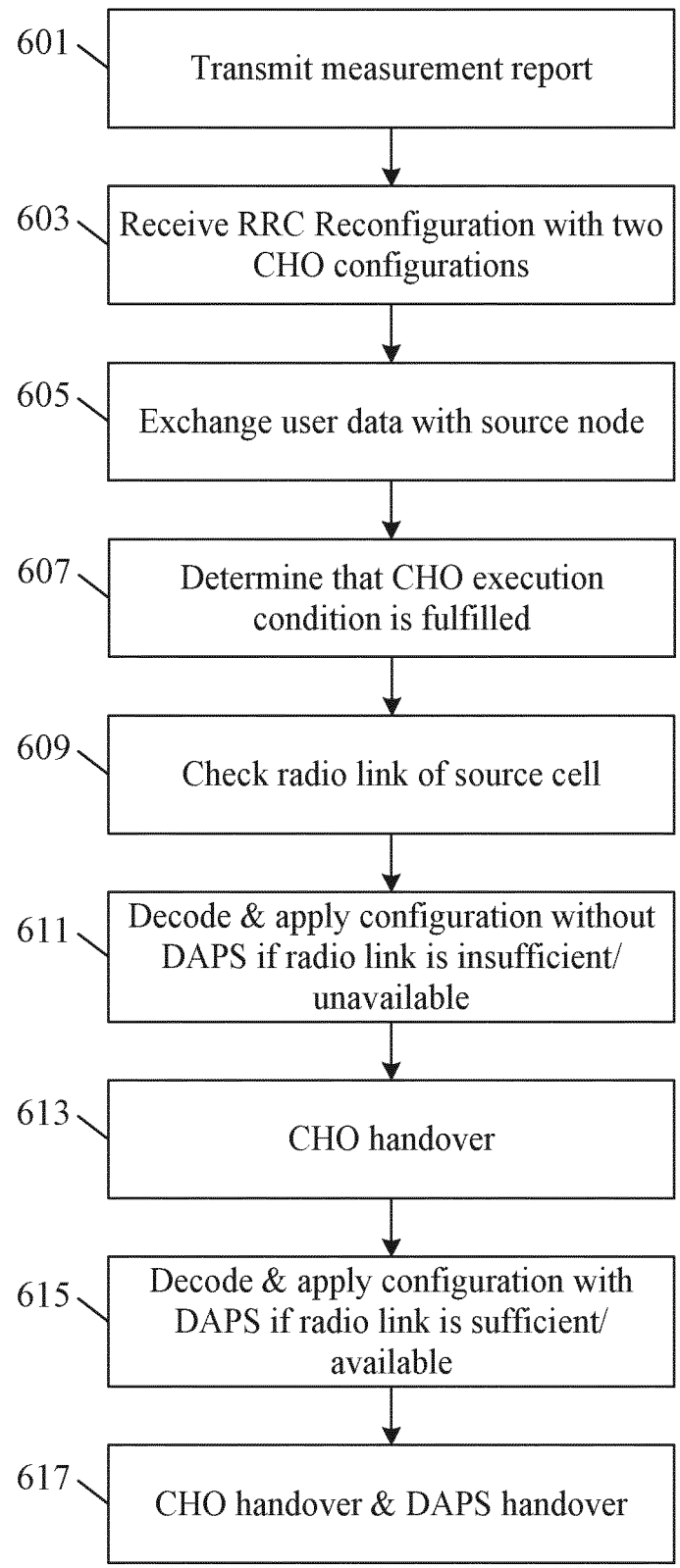
FIG. 6 illustrates an example of a flow diagram of a method according to certain embodiments.

FIG. 6 illustrates an example of a flow diagram of a method that may be performed by a UE, such as UE 1010 illustrated in FIG. 10, according to various embodiments. At 601, the UE may transmit measurement reports to a SN, which may transmit a CHO request (with DAPS) to a TN. The SN may be similar to NE 1020, as illustrated in FIG. 10, according to certain embodiments. At 603, the UE may receive an RRC Reconfiguration message with two CHO configurations. The first configuration may be for CHO and DAPS handover with a reduced target cell configuration, such as PCell only configuration, and the second configuration may be for CHO only, such as a full target configuration (target PCell+SCell configurations). At 603 the UE may receive the two cell configurations associated with the same CHO execution condition from the SN, and at 605, the UE and the SN may exchange user data.

At 607, the UE may determine that CHO execution condition has been fulfilled, and may check radio link with the SN at 609. For example, the check of radio link with the SN may include that beam failure detection has been already detected, and/or radio link is not yet recovered. This may be where timer T310 has not yet expired, and the UE is in a beam failure recovery procedure. In addition, the check of radio link with the SN may also include active T310 or T312 timers for RLF detection. Additionally or alternatively, signal strength (e.g., RSRP), signal quality (e.g., RSRQ), and/or SINR of the source link may be below a threshold, which may be provided by the SN or a TN using dedicated signalling or in system information. Another check of radio link with the SN may include that at least N≥1 out-of-sync indications are reported by the physical layer, where N could be configured by the SN and/or TN. Finally, 609 may be performed based on the number of RLC re-transmissions, random access re-transmissions or scheduling requests for the SN 440 have reached a certain number, Q, configured by the SN or TN.

At 611, the UE may determine that the radio link is insufficient or unavailable, and decode and apply the second configuration for CHO only. With the CHO configuration applied, at 613, the UE may perform a CHO handover procedure with the SN and the TN. However, at 615, if the UE determines that the radio link is sufficient and available, the UE may decode and apply the first configuration with DAPS. Using the first configuration, at 617, the UE may perform CHO & DAPS handover with the SN and the TN.

Figure 7:
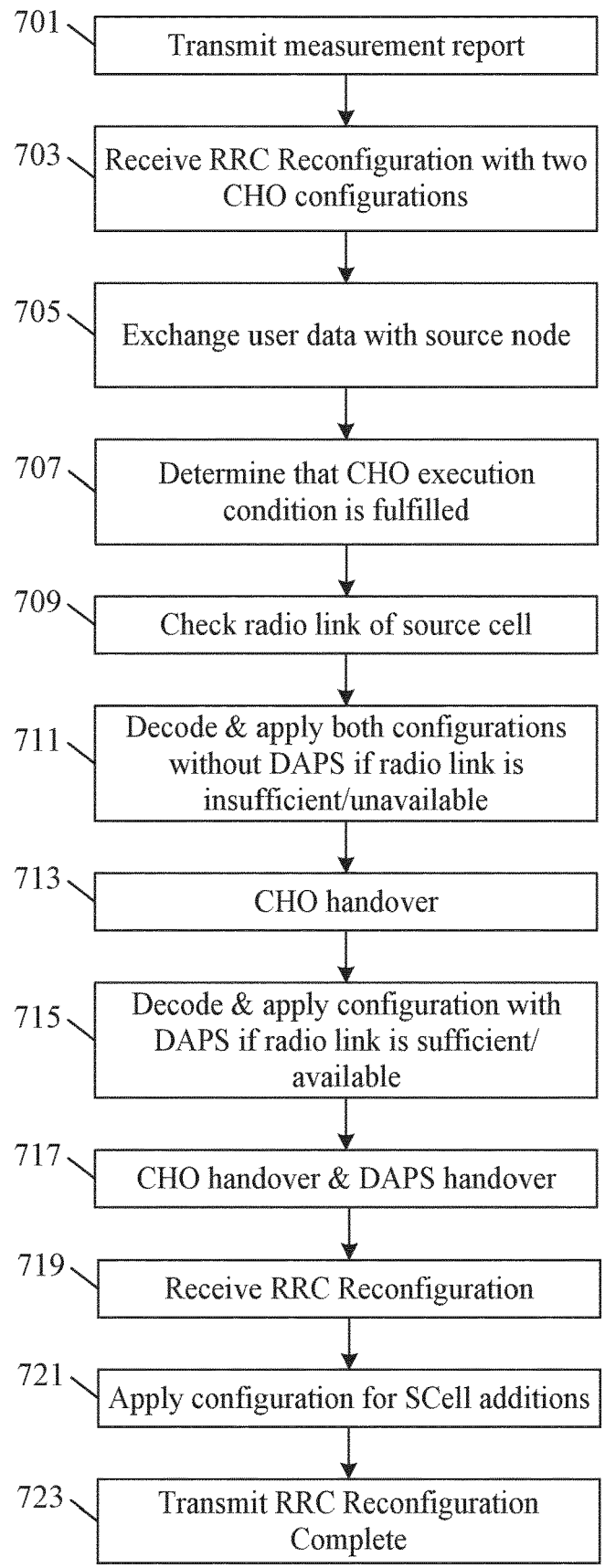
FIG. 7 illustrates an example of a flow diagram of another method according to some embodiments.

FIG. 7 illustrates an example of a flow diagram of a method that may be performed by a UE, such as UE 1010 illustrated in FIG. 10, according to various embodiments. At 701, the UE may transmit measurement reports to a SN, which may be similar to NE 1020, as illustrated in FIG. 10, according to certain embodiments. At 703, the UE may receive an RRC Reconfiguration message with two CHO configurations. The first configuration may be for a reduced target cell configuration, such as PCell only configuration, and the second configuration may be for the addition of SCells, and at 705, the UE and the SN may exchange user data.

At 707, the UE may determine that CHO execution condition has been fulfilled, and may check radio link with the SN at 709. For example, the check of radio link with the SN may include that beam failure detection has been already detected, and/or radio link is not yet recovered. This may be where timer T310 has not yet expired, and the UE is in a beam failure recovery procedure. In addition, the check of radio link with the SN may also include active T310 or T312 timers for RLF detection. Additionally or alternatively, signal strength (e.g., RSRP), signal quality (e.g., RSRQ), and/or SINR of the source link may be below a threshold, which may be provided by the SN or a TN using dedicated signalling or in system information. Another check of radio link with the SN may be that at least N≥1 out-of-sync indications are reported by the physical layer, where N could be configured by the SN and/or TN. Finally, 709 may be performed based on the number of RLC re-transmissions, random access re-transmissions or scheduling requests for the SN 440 have reached a certain number, Q, configured by the SN or TN.

At 711, the UE may determine that the radio link is insufficient or unavailable, and decode & apply the first and second configurations. With both configurations applied, at 713, the UE may perform a CHO handover procedure with the SN and the TN. However, at 715, if the UE determines that the radio link is sufficient and available, the UE may decode and apply the first configuration with reduced target cell configuration (PCell). Using the first configuration, at 717, the UE may perform CHO & DAPS handover with the SN and TN. At 719, the UE may receive from the TN an RRC Reconfiguration message to release the protocol stack of the SN. At 721, the UE may then decode & apply the second configuration for adding SCells, and at 723, transmit an RRC Reconfiguration Complete message to the TN. In this way, the UE may fallback to executing CHO rather than CHO/DAPS when the radio link of the SN is insufficient or unavailable, avoiding some disadvantages of continuing with DAPS.

Figure 8:
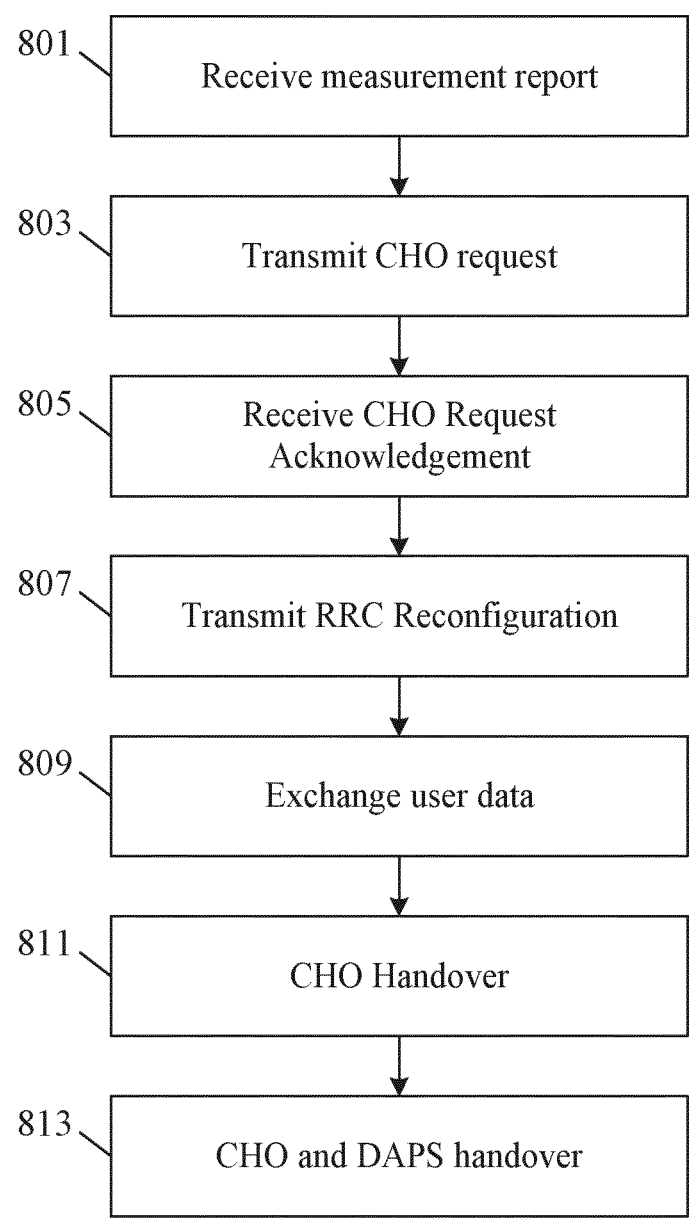
FIG. 8 illustrates an example of a flow diagram of another method according to various embodiments.

FIG. 8 illustrates an example of a flow diagram of a method that may be performed by a SN, such as NE 1020 illustrated in FIG. 10, according to various embodiments. At 801, the NE may receive measurement reports a UE, which may then transmit a CHO request (with DAPS) to a TN, as shown at 803. At 805, the SN may receive two target cell configurations from the TN. The first configuration may be for CHO and DAPS handover with a reduced target cell configuration, such as PCell only configuration, and the second configuration may be for CHO only, such as a full target configuration (target PCell+SCell configurations). At 807, the SN may transmit the two cell configurations associated with the same CHO execution condition to the UE, and at 809, the UE and the SN may exchange user data. At 811, the SN may perform a CHO handover, or alternatively, at 813, the SN may perform a CHO and DAPS handover procedure.

Figure 9:
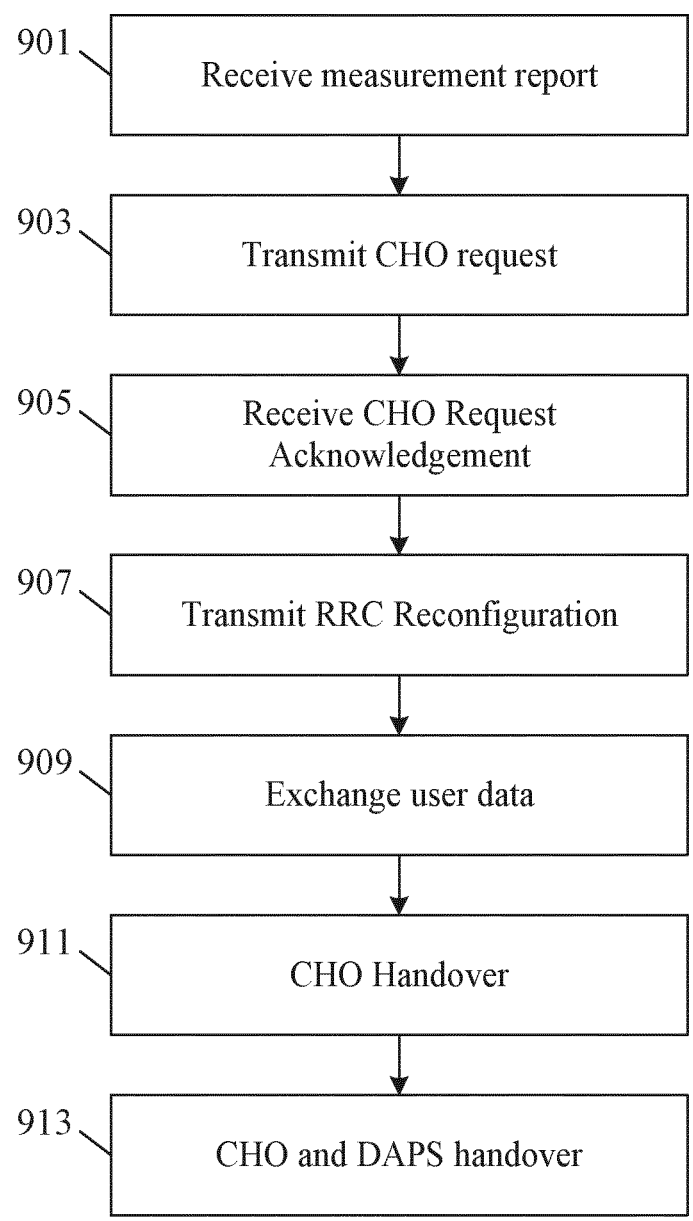
FIG. 9 illustrates an example of a flow diagram of another method according to certain embodiments.

FIG. 9 illustrates an example of a flow diagram of a method that may be performed by a SN, such as NE 1020 illustrated in FIG. 10, according to various embodiments. At 901, the NE may receive measurement reports from a UE, and may transmit a CHO request (with DAPS) to a TN at 903. The SN may receive two target cell configurations from the TN at 905. The first configuration may be for a reduced target cell configuration, such as PCell only configuration, and the second configuration may be for the addition of SCells. At 907, the SN may transmit the two cell configurations to the UE, along with CHO execution conditions, and at 909, the UE and the SN may exchange user data. At 911, the SN may perform a CHO handover, or alternatively, at 913, the SN may perform a CHO and DAPS handover procedure.

FIG. 10 illustrates an example of a system according to certain example embodiments. In one example embodiment, a system may include multiple devices, such as, for example, UE 1010 and/or NE 1020.

UE 1010 may include one or more of a mobile device, such as a mobile phone, smart phone, personal digital assistant (PDA), tablet, or portable media player, digital camera, pocket video camera, video game console, navigation unit, such as a global positioning system (GPS) device, desktop or laptop computer, single-location device, such as a sensor or smart meter, or any combination thereof.

NE 1020 may be one or more of a base station, such as an eNB or gNB, a serving gateway, a server, and/or any other access node or combination thereof. Furthermore, UE 1010 and/or NE 1020 may be one or more of a citizens broadband radio service device (CBSD).

NE 1020 may further comprise at least one gNB-CU, which may be associated with at least one gNB-DU. The at least one gNB-CU and the at least one gNB-DU may be in communication via at least one F1 interface, at least one $X_n$-C interface, and/or at least one NG interface via a 5GC.

UE 1010 and/or UE NE 1020 may include at least one processor, respectively indicated as 1011 and 1021. Processors 1011 and 1021 may be embodied by any computational or data processing device, such as a central processing unit (CPU), application specific integrated circuit (ASIC), or comparable device. The processors may be implemented as a single controller, or a plurality of controllers or processors.

At least one memory may be provided in one or more of the devices, as indicated at 1012 and 1022. The memory may be fixed or removable. The memory may include computer program instructions or computer code contained therein. Memories 1012 and 1022 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate from the one or more processors. Furthermore, the computer program instructions stored in the memory, and which may be processed by the processors, may be any suitable form of computer program code, for example, a compiled or interpreted computer program written in any suitable programming language.

Processors 1011 and 1021, memories 1012 and 1022, and any subset thereof, may be configured to provide means corresponding to the various blocks of FIGS. 4-9. Although not shown, the devices may also include positioning hardware, such as GPS or micro electrical mechanical system (MEMS) hardware, which may be used to determine a location of the device. Other sensors are also permitted, and may be configured to determine location, elevation, velocity, orientation, and so forth, such as barometers, compasses, and the like.

As shown in FIG. 10, transceivers 1013 and 1023 may be provided, and one or more devices may also include at least one antenna, respectively illustrated as 1014 and 1024. The device may have many antennas, such as an array of antennas configured for multiple input multiple output (MIMO) communications, or multiple antennas for multiple RATs. Other configurations of these devices, for example, may be provided. Transceivers 1013 and 1023 may be a transmitter, a receiver, both a transmitter and a receiver, or a unit or device that may be configured both for transmission and reception.

The memory and the computer program instructions may be configured, with the processor for the particular device, to cause a hardware apparatus, such as UE, to perform any of the processes described above (i.e., FIGS. 4-9). Therefore, in certain embodiments, a non-transitory computer-readable medium may be encoded with computer instructions that, when executed in hardware, perform a process such as one of the processes described herein. Alternatively, certain embodiments may be performed entirely in hardware.

In certain embodiments, an apparatus may include circuitry configured to perform any of the processes or functions illustrated in FIGS. 4-9. For example, circuitry may be hardware-only circuit implementations, such as analog and/or digital circuitry. In another example, circuitry may be a combination of hardware circuits and software, such as a combination of analog and/or digital hardware circuitry with software or firmware, and/or any portions of hardware processors with software (including digital signal processors), software, and at least one memory that work together to cause an apparatus to perform various processes or functions. In yet another example, circuitry may be hardware circuitry and or processors, such as a microprocessor or a portion of a microprocessor, that includes software, such as firmware, for operation. Software in circuitry may not be present when it is not needed for the operation of the hardware.

Figure 11:
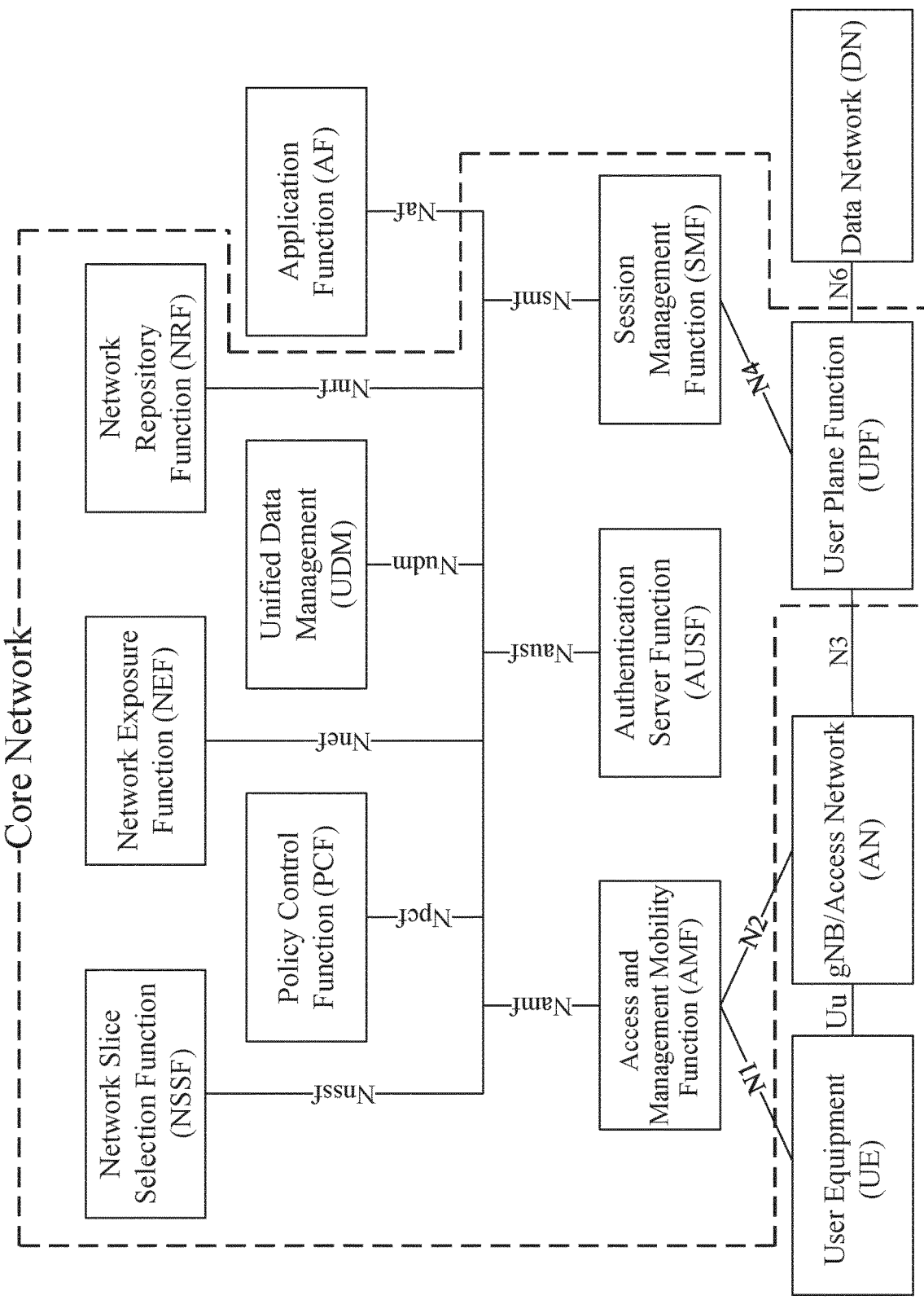
FIG. 11 illustrates an example of a 5G network and system architecture according to certain embodiments.

FIG. 11 illustrates an example of a 5G network and system architecture according to certain embodiments. Shown are multiple network functions that may be implemented as software operating as part of a network device or dedicated hardware, as a network device itself or dedicated hardware, or as a virtual function operating as a network device or dedicated hardware. The NE and UE illustrated in FIG. 11 may be similar to UE 1010 and NE 1020, respectively. The user plane function (UPF) may provide services such as intra-RAT and inter-RAT mobility, routing and forwarding of data packets, inspection of packets, user plane quality of service (QOS) processing, buffering of downlink packets, and/or triggering of downlink data notifications. The application function (AF) may primarily interface with the core network to facilitate application usage of traffic routing and interact with the policy framework.

The features, structures, or characteristics of example embodiments described throughout this specification may be combined in any suitable manner in one or more example embodiments. For example, the usage of the phrases "various embodiments," "certain embodiments," "some embodiments," or other similar language throughout this specification refers to the fact that a particular feature, structure, or characteristic described in connection with an example embodiment may be included in at least one example embodiment. Thus, appearances of the phrases "in various embodiments," "in certain embodiments," "in some embodiments," or other similar language throughout this specification does not necessarily all refer to the same group of example embodiments, and the described features, structures, or characteristics may be combined in any suitable manner in one or more example embodiments.

Additionally, if desired, the different functions or procedures discussed above may be performed in a different order and/or concurrently with each other. Furthermore, if desired, one or more of the described functions or procedures may be optional or may be combined. As such, the description above should be considered as illustrative of the principles and teachings of certain example embodiments, and not in limitation thereof.

One having ordinary skill in the art will readily understand that the example embodiments discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of the example embodiments.

Partial Glossary

3GPP Third Generation Partnership Project
5G Fifth Generation
5GC Fifth Generation Core
5GS Fifth Generation System
5QI Fifth Generation Quality of Service Indicator
AMF Access and Mobility Management Function
ASIC Application Specific Integrated Circuit
BS Base Station
CBSD Citizens Broadband Radio Service Device
CHO Conditional Handover
CG Configured Grant
CN Core Network
CPU Central Processing Unit
DAPS Dual Active Protocol Stack
DL Downlink
DRB Data Radio Bearer
DU Distributed Unit
eMBB Enhanced Mobile Broadband
eMTC Enhanced Machine Type Communication
eNB Evolved Node B eOLLA Enhanced Outer Loop Link Adaptation
EPS Evolved Packet System
FR Frequency Range
gNB Next Generation Node B
GPS Global Positioning System
HARQ Hybrid Automatic Repeat Request
HDD Hard Disk Drive
HO Handover
HOF Handover Failure
L1 Layer 1
L2 Layer 2
LTE Long-Term Evolution
LTE-A Long-Term Evolution Advanced
MAC Medium Access Control
MBS Multicast and Broadcast Systems
MCS Modulation and Coding Scheme
MEMS Micro Electrical Mechanical System
MIMO Multiple Input Multiple Output
MME Mobility Management Entity
mMTC Massive Machine Type Communication
MPDCCH Machine Type Communication Physical Downlink Control Channel
MTC Machine Type Communication
NAS Non-Access Stratum
NE Network Entity
NG Next Generation
NG-eNB Next Generation Evolved Node B
NG-RAN Next Generation Radio Access Network
NR New Radio
NR-U New Radio Unlicensed
OFDM
OLLA PBR
Orthogonal Frequency Division Multiplexing
Outer Loop Link Adaptation
Prioritized Bit Rate PCell Primary Cell
PDA Personal Digital Assistance
PHY Physical
RACH Random Access
RAM Random Access Memory
RAN Radio Access Network
RAT Radio Access Technology
RE Resource Element
RLC Radio Link Control
RLF Radio Link Failure
RRC Radio Resource Control
RS Reference Signal
RSRP Reference Signal Received Power
RSRQ Reference Signal Received Quality
RX Reception
SCell Secondary Cell
SDU Service Data Unit
SFN System Frame Number
SIB System Information Block
SINR Signal-to-Interference Noise Ratio
SMF Session Management Function
SN Source Node
SR Scheduling Report
SRB Signaling Radio Bearer
TB Transport Block
TDD Time Division Duplex
TN Target Node
TR Technical Report
TS Technical Specification
TX Transmission
UE User Equipment
UL Uplink
UMTS Universal Mobile Telecommunications System
UPF User Plane Function
URLLC Ultra-Reliable and Low-Latency Communication
UTRAN Universal Mobile Telecommunications System Terrestrial Radio Access Network
WLAN Wireless Local Area Network

We claim:

1. An apparatus, comprising:
   at least one processor; and
   at least one memory including computer program code, wherein the at least one memory and the computer program code are configured to, with the at least one processor, cause the apparatus at least to:
   receive, from a source cell, a first configuration configured for conditional handover and dual active protocol stack handover with a reduced target cell configuration, and a second configuration configured for conditional handover only;
   determine an availability of at least one radio link associated with the source cell based on the following: a beam failure detection associated with the source cell, an active radio link failure (RLF) detection timer for the source cell, a signal strength of the source cell link being below a predetermined threshold, a number of out-of-sync indications reported by a physical layer for the source cell reaching a predetermined number, a number of radio link control (RLC) re-transmissions for the source cell reaching a predetermined number, and the sufficiency and the availability of the at least one radio link associated with the source cell; and
   determine, at a first time, that the at least one radio link associated with the source cell is insufficient or unavailable;
   based on determining that the at least one radio link associated with the source cell is insufficient or unavailable, perform a first conditional handover procedure wherein the first conditional handover procedure comprises:
      decoding and applying the second configuration; and
      performing a non-dual active protocol stack conditional handover with a source node and a target node;
   determine, at a second time, that the at least one radio link associated with the source cell is sufficient or available; and
   based on determining that the at least one radio link associated with the source cell is sufficient or available, perform a second conditional handover procedure, wherein second conditional handover procedure comprises:
      decoding and applying the first configuration with a dual active protocol stack;
      performing a conditional handover and dual active protocol stack handover with the source node and the target node; and
      subsequently, upon receiving, from the target node, a radio resource control (RRC) reconfiguration message to release the protocol stack of the source node, decoding and applying a configuration for adding secondary cells and transmitting an RRC reconfiguration complete message to the target node.

2. The apparatus of claim 1, wherein the at least one memory and the computer program code are further configured to, with the at least one processor, cause the apparatus at least to: transmit measurement reports to a source node.

3. The apparatus of claim 1, wherein the at least one memory and the computer program code are further configured to, with the at least one processor, cause the apparatus at least to: exchange user data with a source node.

4. The apparatus of claim 1, wherein the first configuration comprises a primary cell only configuration.

5. The apparatus of claim 1, wherein the second configuration comprises one or more of at least one target primary cell configuration and at least one secondary cell configuration.

6. The apparatus of claim 1, wherein a conditional handover procedure may be based upon the second configuration when a radio link is below at least one threshold.

7. The apparatus of claim 1, wherein a conditional handover procedure may be based upon the first configuration when the radio link is at least at equal to or greater than at least one threshold.

8. An apparatus, comprising:
   at least one processor; and
   at least one memory including computer program code, wherein the at least one memory and the computer program code are configured to, with the at least one processor, cause the apparatus at least to:
   receive, from a source cell, a first configuration configured for a reduced target cell configuration, and a second configuration configured for the addition of secondary cells;
   determine an availability of at least one radio link associated with the source cell based on the following: a beam failure detection associated with the source cell, an active radio link failure (RLF) detection timer for the source cell, a signal strength of the source cell link being below a predetermined threshold, a number of out-of-sync indications reported by a physical layer for the source cell reaching a predetermined number, a number of radio link control (RLC) re-transmissions for the source cell reaching a predetermined number, and the sufficiency and the availability of the at least one radio link associated with the source cell;

determine, at a first time, that the at least one radio link associated with the source cell is insufficient or unavailable;

based on determining that the at least one radio link associated with the source cell is insufficient or unavailable, perform a first conditional handover procedure, wherein the first handover procedure comprises:

decoding and applying the second configuration; and performing a non-dual active protocol stack conditional handover with a source node and a target node;

determine, at a second time, that the at least one radio link associated with the source cell is sufficient or available; and based on determining that the at least one radio link associated with the source cell is sufficient or available, perform a second conditional handover procedure, wherein second conditional handover procedure comprises:

decoding and applying the first configuration with a dual active protocol stack;

performing a conditional handover and dual active protocol stack handover with the source node and the target node; and subsequently, upon receiving, from the target node, a radio resource control (RRC) reconfiguration message to release the protocol stack of the source node, decoding and applying a configuration for adding secondary cells and transmitting an RRC reconfiguration complete message to the target node.

9. The apparatus of claim 8, wherein the at least one memory and the computer program code are further configured to, with the at least one processor, cause the apparatus at least to: exchange data with a source node.

10. The apparatus of claim 8, wherein the at least one memory and the computer program code are further configured to, with the at least one processor, cause the apparatus at least to: upon receiving from a target node a radio resource control reconfiguration message to release the protocol stack of a source node, decode and apply the second configuration for adding secondary cells and transmit a radio resource control reconfiguration complete message to a target node.

11. The apparatus of claim 8, wherein the first configuration is configured for primary cell only configurations.

12. A method comprising:

receiving, by a user equipment from a source cell, a first configuration configured for conditional handover and dual active protocol stack handover with a reduced target cell configuration, and a second configuration configured for conditional handover only;

determining, by the user equipment, an availability of at least one radio link associated with the source cell based on the following: a beam failure detection associated with the source cell, an active radio link failure (RLF) detection timer for the source cell, a signal strength of the source cell link being below a predetermined threshold, a number of out-of-sync indications reported by a physical layer for the source cell reaching a predetermined number, a number of radio link control (RLC) re-transmissions for the source cell reaching a predetermined number, and the sufficiency and the availability of the at least one radio link associated with the source cell;

determining, by the user equipment at a first time, that the at least one radio link associated with the source cell is insufficient or unavailable;

based on determining that the at least one radio link associated with the source cell is insufficient or unavailable, performing, by the user equipment, a first conditional handover procedure, wherein the first conditional handover procedure comprises:

decoding and applying the second configuration; and performing a non-dual active protocol stack conditional handover with a source node and a target node;

determining, by the user equipment at a second time, that the at least one radio link associated with the source cell is sufficient or available; and based on determining that the at least one radio link associated with the source cell is sufficient or available, performing, by the user equipment, a second conditional handover procedure, wherein second conditional handover procedure comprises:

decoding and applying the first configuration with a dual active protocol stack; and performing a conditional handover and dual active protocol stack handover with the source node and the target node; and subsequently, upon receiving, from the target node, a radio resource control (RRC) reconfiguration message to release the protocol stack of the source node, decoding and applying a configuration for adding secondary cells and transmitting an RRC reconfiguration complete message to the target node.

\* \* \* \* \*